Sept. 20, 1966  T. M. ELFVING  3,273,347
THERMOELECTRIC HEAT PUMP ASSEMBLY
Filed June 14, 1965  3 Sheets-Sheet 1
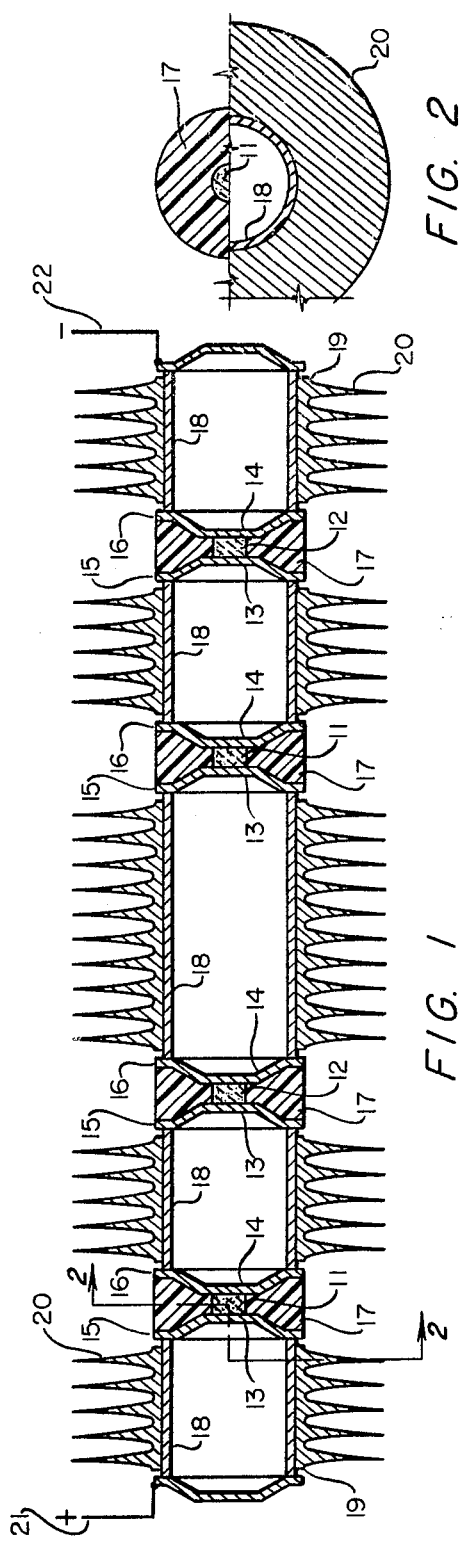
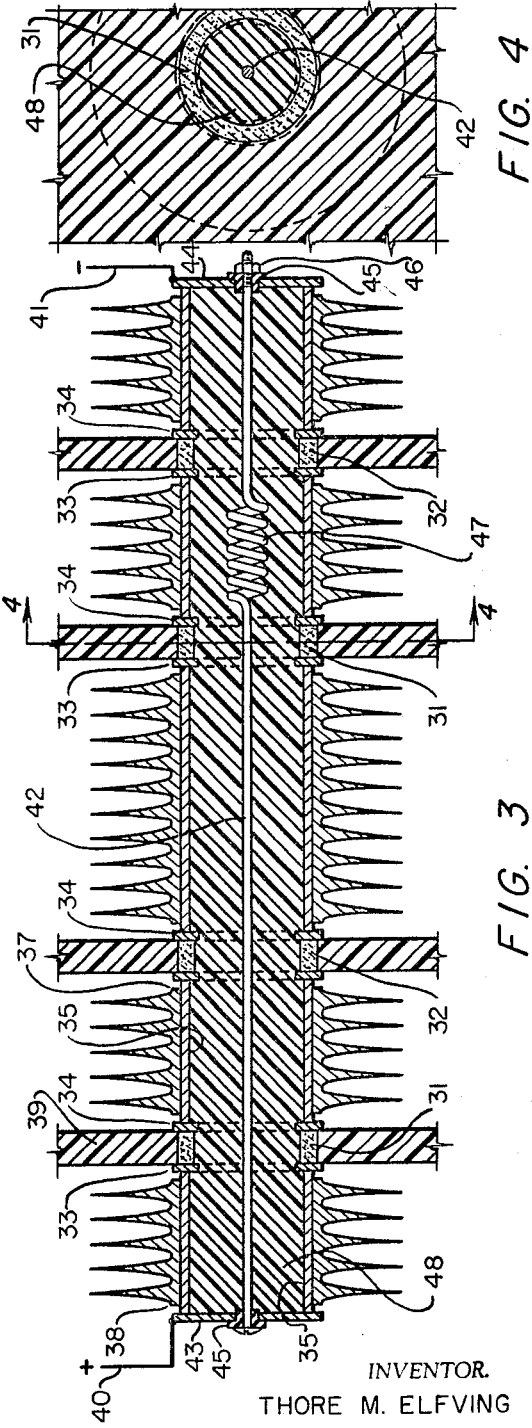
INVENTOR.
THORE M. ELFVING
BY
Flehr and Swain
ATTORNEYS

INVENTOR.
THORE M. ELFVING

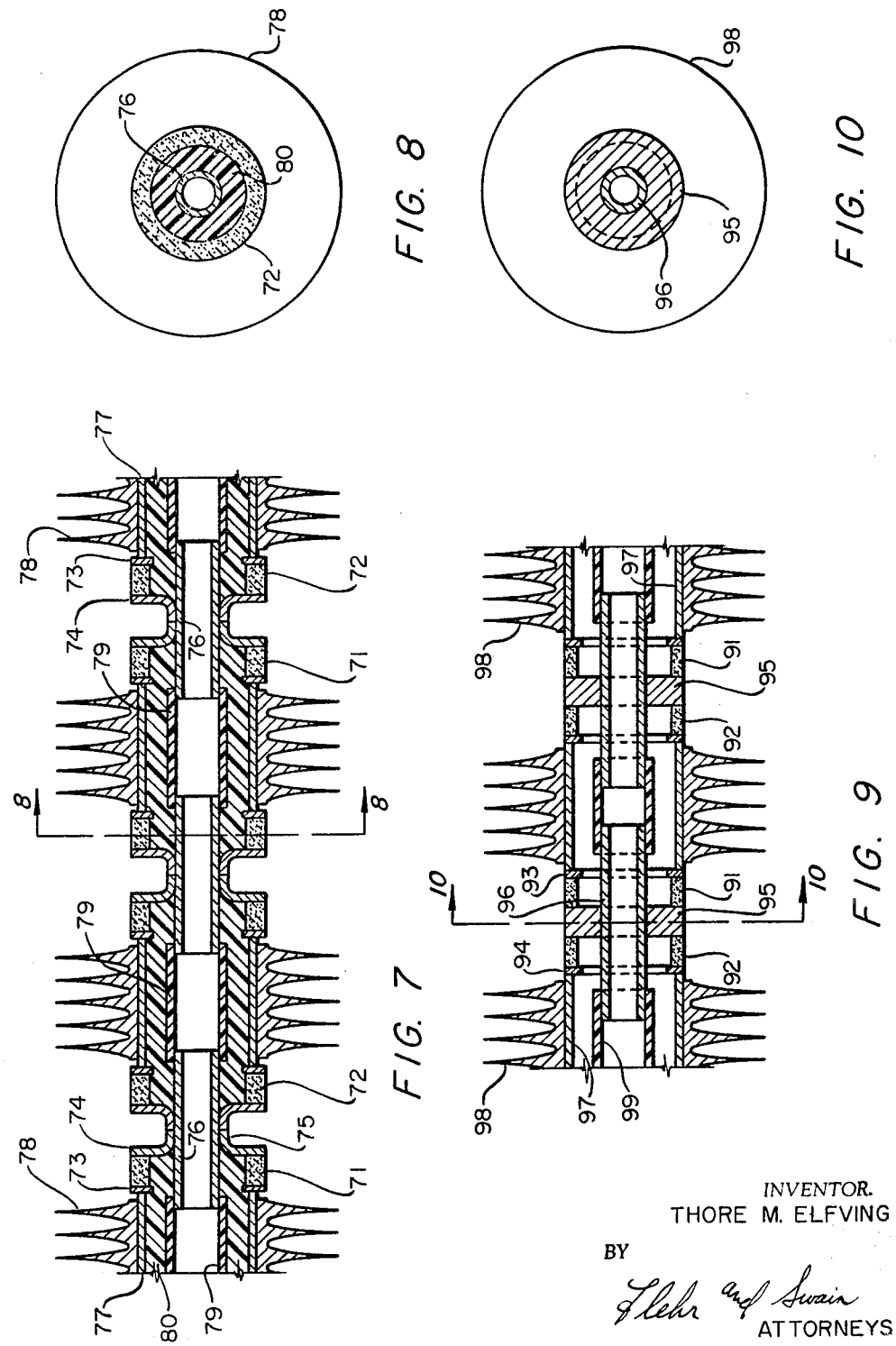

United States Patent Office 3,273,347
Patented Sept. 20, 1966

3,273,347
THERMOELECTRIC HEAT PUMP ASSEMBLY
Thore M. Elfving, 433 Fairfax Ave., San Mateo, Calif.
Filed June 14, 1965, Ser. No. 463,713
21 Claims. (Cl. 62—3)

The present invention relates to thermoelectric heat pump assemblies of the air-to-air and liquid-to-air type and has for its purpose to provide easily assembly heat pumps of great efficiency and reliability for use in air conditioning and refrigeration systems of various types.

In my copending application Ser. No. 441,804, filed Mar. 22, 1965, there are shown heat pump assemblies utilizing finned tubing sections as junction bridges for maximum heat transfer surface to air. Bimetallic tubings of this type are especially suitable in the thermoelectric field for attachment of semiconductive bodies to copper parts while heat transfer surfaces to air are provided by light-weight aluminum fins.

In my copending application Ser. No. 460,209, filed on or about June 1, 1965, there are shown thermoelectric subcouple and couple assemblies which are presoldered, prestressed and insulated for protection of the semiconductive bodies and critical joints.

It is an object of this invention to provide an air-to-air heat pump assembly utilizing subcouples having annular semiconductor material or annularly arranged bodies of material and bimetallic finned tubing sections.

It is another object of the present invention to provide air-to-air and liquid-to-air heat pump systems utilizing annular bodies of semiconductor material and finned tube sections in longitudinal alignment.

It is another object of the present invention to provide an air-to-air heat pump system with thermocouples assembled and arranged in one or more single rows with the linear assembly of each row prestressed by means of centrally or symmetrically arranged bolting or clamping means which provide a substantially uniform pressure between the semiconductor elements and junction bridges in the direction of the axis or centerline of each linear assembly.

It is another object of the present invention to provide a liquid-to-air heat pump system of the above type with the liquid conduit running through annular semiconductor bodies and finned tube sections.

It is still another object of this invention to provide a light-weight thermoelectric air-to-air heat pump assembly for mounting in a portable or movable casing.

Further objects and advantages of this invention and features of novelty will be seen from the following specification and in the claims with reference to the accompanying drawings in which FIGURES 1 and 2 are sectional views of an air-to-air heat pump assembly utilizing preassembled subcouples;

FIGURES 3 and 4 are sectional views of an air-to-air heat pump assembly, according to the invention, utilizing annular semiconductive bodies;

FIGURES 7 and 8 are sectional views of a liquid-to-air heat pump assembly according to the invention; and FIGURES 9 and 10 are sectional views of a portion of another liquid-to-air assembly according to the invention.

Figure 5:
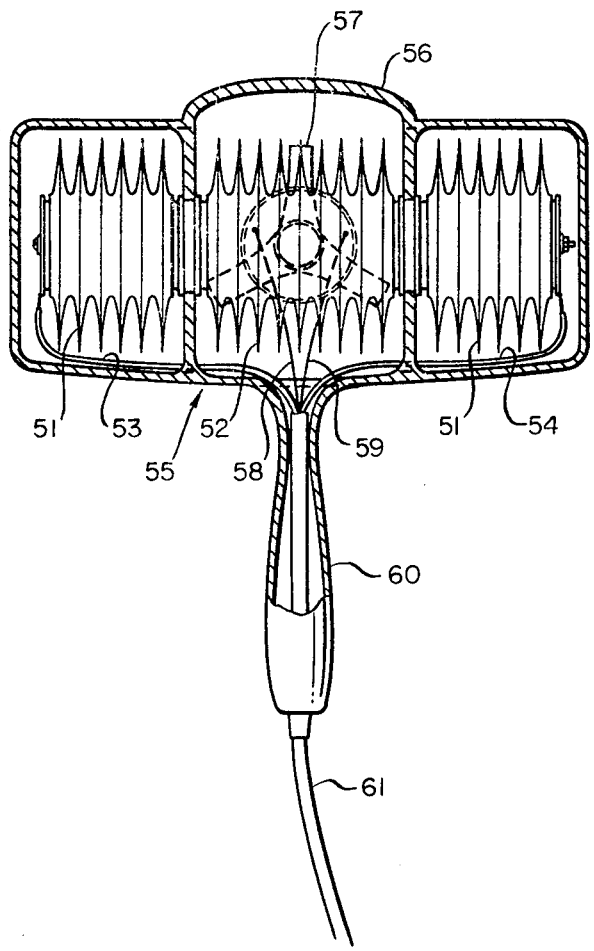
FIGURES 5 and 6 are partial sectional views of a portable air conditioner or air cooler employing an assembly in accordance with the invention.

Referring to FIGURES 1 and 2, there is shown an air-to-air assembly using preassembled subcouples with n and p type bodies of semiconductive material 11 and 12, respectively, soldered to the elevated portions 13 and 14 preferably of nickel plated copper discs 15 and 16, respectively. The copper discs have been put under pressure and the space around the semiconductive bodies filled with an adhesive material such as epoxy or with a strong foam plastic material 17 allowed to set while maintaining the pressure. The hot and cold junction discs are soft soldered to the copper lining 18 of finned tubing sections 19 having aluminum fins 20. The assembly is energized through leads 21 and 22 in such a way that the first, middle and last sections become hot, and the other sections become cold. The assembly comprises two complete couples with a larger common hot junction section and can, according to the invention, be prestressed by symmetrically arranged bolting means on the side of the finned tubing.

Referring to FIGURES 3 and 4, there is shown a thermoelectric air-to-air assembly using annular or ring-shaped bodies of semiconductor material 31 and 32 of n and p type, respectively. The annular bodies are each on their flat sides suitably soldered or bonded to nickel plated copper washers 33 and 34 for later soft soldering to hot and cold junction bridges, respectively. The copper washers should have flat surfaces of area corresponding to the surfaces on the bodies to minimize heat losses between the same. The unit represents a subcouple of n or p type semiconductor material and a thermoelectric heat pump assembly can now be assembled simply by soft soldering alternate n and p type, hot and cold side, washers to the exposed ends of copper lining 35 of bimetallic finned tube sections 38 and 37 which serve as hot and cold junction bridges, respectively. The finned tube sections, semiconductor bodies and washers are longitudinally aligned and current flows from one end to the other between leads 40 and 41. There are formed alternate hot and cold fin tube sections (junction bridges) in heat exchange with air to be cooled and heat sink air. Suitable insulating partitions 39 direct the heat sink and cooled air over the finned tube sections.

When energized through leads 40 and 41, the end and middle finned tube sections become hot junction bridges, while the other finned tube sections become cold junctions. The hot junction middle section is in common for the two complete couples represented by the assembly and can be made longer or larger for greater heat dissipation capacity. The area over length ratio (A/L) for the semiconductive bodies can easily be chosen by appropriately dimensioning the annular n and p type bodies for the desired maximum current and heat pumping capacity. The length and fin spacing of the finned tube sections, together with fan power, air velocity, etc., determine the heat transfer surfaces and heat exchange capacity to air per degree temperature difference between the fins and the air. The shown system is, therefore, exceedingly flexible for incorporation and design into air conditioning systems as a prime heat pump. By choosing hot and cold tubing sections of approximately the same total length, the assembly length will be independent of expansion due to change of polarity.

Thermal and mechanical shocks, and vibration constitute a serious problem in thermoelectric heat pump applications. To protect the critical joints and the semiconductive bodies themselves, the linear array may be clamped or prestressed. With the thermocouples in a symmetrical, linear array, mounted along a straight line, uniform pressure can be applied along the centerline or axis.

The assembly shown in FIGURES 3 and 4 offers an example of such mounting which, in combination with tubular or annular bodies, makes the positioning of a single prestressing bolt or wire along the centerline possible. A strong bolt or wire 42 of stainless steel or other suitable material is disposed longitudinally within the assembly from one end disc 43 to another 44. The bolt 42 may be electrically insulated by a non-conductive bushing 45 and tightened by a nut 46 or similar arrangement thereby stretching a strong spring 47 for applying a predetermined compression force to the linear assembly. The compressive force is substantially uniform on the surface of the bodies and from one body to another because of the axial symmetrical direction of the force. The bolt 42 can at each end be given a suitable form to serve also as a fastening means for mounting the assembly in an air conditioner or similar prime heat pump assembly housing. The compressive force may be such as to provide good electrical and heat conductive connection between the abutting portions of the assembly, and consequently eliminate the requirement for soldering or bonding the parts of the assembly one to the other. The central cavity of the shown assembly can be filled with a foam insulation 48 and the exposed surfaces of the tubular bodies likewise protected by an insulating sleeve (not shown in the figures).

Although, because of its simplicity, it is preferable to employ a single centrally disposed clamping member, it is also possible to use a plurality of clamping members symmetrically arranged about the axis to provide uniform compressive force.

By means of a central bolt 42 or other suitable clamping means, the linear assembly can be so tightly pressed together that the mechanical pressure between the surfaces of adjoining metal components and/or between metal and semiconductive bodies will provide sufficiently good contact joints for electric and thermal conductivity without soldering or brazing.

Known means for improving such contact joints, such as silicon grease, metal compounds, etc., can be applied. Grooves, flanges or depressions on the components can be used for positioning the components mounted around the central bolt.

Elimination of soldering will permit the use of all aluminium metal parts throughout the assembly. Sufficient prestressing for individual subcouples or couple assemblies by mechanical means, according to the invention, can eliminate soldering of critical joints. The use of relatively long semiconductive bodies (L) for a given geometry (A/L) reduces the influence of the contact resistance ($\delta_c$). The increased volume of semiconductive material is offset by the lower price of such material.

Figure 6:
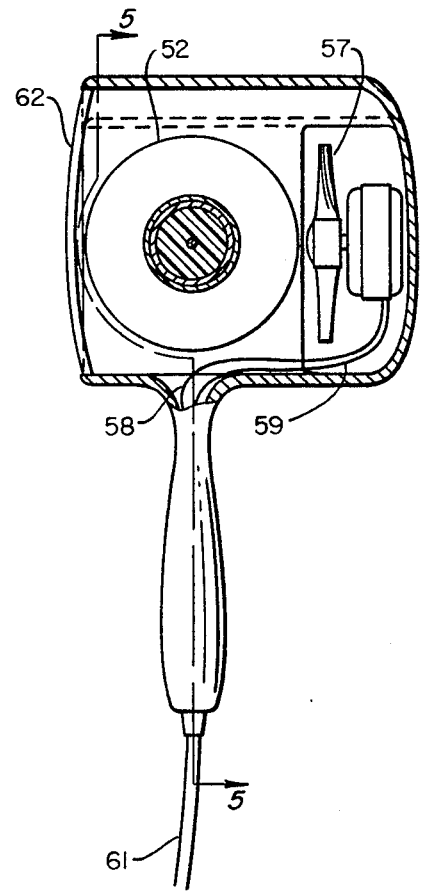

In FIGURES 5 and 6 there is shown how three finned sections utilizing one complete thermocouple assembly are longitudinally aligned and assembled, as described with respect to FIGURES 3 and 4, to form a miniature air conditioner which can be energized from a battery, for example, in an automobile.

Two hot junction finned tube sections 51 and one cold junction finned tube section 52 are joined and stressed as previously described and energized through leads 53 and 54 to form a thermoelectric heat pump. The assembly is mounted in a case 55 which forms a semi-closed housing 56 around the middle section 52. A small fan 57 is mounted behind the middle or cold tube section 52. The fan may also be energized from the associated battery through leads 58 and 59 which, together with the heavier leads 53 and 54, are threaded through the handle 60 connected to cable 61. The finned tube sections are protected by guards 62. The hot junction bridges need no fan as the whole device can be moved by hand for increased heat dissipation. The fan 57 blows air over the middle section for cooling the face of the holder, etc. Several couple assemblies of this type with smaller dimensions of the finned tube section and the smaller diameter of the annular bodies can be arranged with the sections in parallel but electrically in series for increased resistance. A second fan can be used also for blowing air over the hot junction end sections in an opposite direction. The device which produces both hot and cooled air can be mounted in many different ways for desk use, overhead coolers and/or heaters, etc.

Referring to FIGURES 7 and 8, there is shown a liquid-to-air heat pump assembly utilizing pairs of annular semiconductive bodies 71 and 72 of n and p type semiconductor material, respectively. The annular bodies are on similar ends, for example, the hot junction ends, presoldered to copper washers 73, and on their other sides attached to copper discs 74 provided with flanges 75. A pair of subcouple assemblies each comprising a copper washer 73, a semiconductive body of n or p type material and a disc 74, are with their copper flanges 75 soldered to a central metal pipe section 76 and with their copper washers 73 to the copper lining 77 of a finned tube section with aluminum fins 78, as illustrated in the figures. The central pipe section 76 is joined by means of a non-conductive pipe section 79 to the metal pipe section in the next couple assembly to form a continuous liquid conduit running in the center of the finned section and through the tubular semiconductive bodies. The non-conducting pipe section can act to apply longitudinal tension to the thermocouple joints. By surrounding the conduit with a strong foam material for insulation 80, the assembly structure becomes mechanically very strong with no risk of breaking the critical joints. The shown heat pump assembly can be energized in the usual way and used as an air-cooled liquid cooler or as a liquid-cooled air cooler.

In FIGURES 9 and 10 is shown another embodiment of the liquid side of the thermocouple used in FIGURES 7 and 8. The annular semiconductive bodies 91 and 92 of n and p type semiconductor material, respectively, are soldered on similar sides to copper washers 93 and 94 while their other sides are soldered to a common copper ring element 95 of annular shape with a metal pipe section 96 soldered or braced to the center hole of the copper ring. The copper washers 93 and 94 are, as before, soldered to the copper lining 97 of bimetallic finned tube sections 98. The pipe section 96 is joined by non-conductive pipe sections 99 to other metal pipe sections as previously described.

After energizing the assembly, the current flow is all along the tubular cylindrical surface of the assembly, along the copper lining 97 in a finned section, through a washer 94, through the annular body 92 as part of the tubular structure, then across the copper ring 95 to the annular body 91 and over a washer 93 to the copper lining 97 in tht next finned section. There is no current passing through the ring element 95 across the inserted pipe section 96. The copper washers attached to the semiconductive rings can be made with almost exactly the same surface area as the semiconductive bodies and a minimum of hot and cold surfaces are, therefore exposed to each other. The ring-shaped critical joints are much stronger per unit area than the joints created by solid bodies and in the liquid-to-air system the inserted pipe section with the surrounding insulation reinforces the critical joints considerably.

The linear assembly shown in both FIGURES 7 and 8 and FIGURES 9 and 10 can, according to the invention, be prestressed by an axial compressive force applied by means of symmetrically arranged bolting means.

It will be apparent that where annular bodies are shown, it will be possible to employ a plurality of individual bodies arranged concentrically about the axis in an annular array to provide the same operation as the annular body. As used herein and in the appended claims, the term "annular body" is intended to encompass this modification.

As will be apparent to one skilled in the art, various changes and numerous modifications of the disclosed structures and assemblies may be made without departing from the spirit of the invention, and all of such changes are contemplated as may come within the scope of the appended claims.

I claim:
1. In a thermoelectric assembly, pairs of semiconductive bodies of dissimilar type with similar ends contacting hot and cold junction bridges to form a linear array of thermocouples in series, at least one of said junction bridges being formed from a tubing section, metal disc elements in contact with the ends of said tubing section and joined to said semiconductive bodies, and fin means extending outwardly from said tubing section for heat exchange to air.

2. A thermoelectric assembly as in claim 1 in which said tubing section is bimetallic with ends suitable for soft soldering to said metal elements.

3. A thermoelectric assembly as in claim 2 in which said ends are in the form of a copper or copper alloy lining extending concentrically inside the entire length of said tubing section.

4. A thermoelectric assembly as in claim 1 in which said semiconductive bodies are annular.

5. A thermoelectric assembly as in claim 1 in which said pairs each comprise several parallel bodies of semiconductive material of each type arranged concentrically about said metal elements.

6. A thermoelectric assembly as in claim 1 in which both the hot and cold junction bridges are in the form of axially aligned finned tubing sections.

7. A thermoelectric assembly as in claim 1 including means for applying a uniform axial compressive force thereto.

8. A thermoelectric assembly as in claim 7 in which said means comprises a central electrically insulated bolt or wire means running through said tubing sections.

9. A thermoelectric assembly as in claim 4 including means for applying a uniform axial compressive force thereto.

10. A thermoelectric assembly as in claim 9 in which said means comprises a central electrically insulated bolt or wire means running through said tubing sections.

11. A thermoelectric assembly as in claim 8 in which said bolt or wire means includes a spring means serving to predetermine and control the prestressing or clamping force.

12. A thermoelectric assembly as in claim 10 in which said bolt or wire means includes a spring means serving to predetermine and control the prestressing or clamping force.

13. A thermoelectric assembly as in claim 8 in which said central bolt or wire means is thermally insulated from the assembly by a surrounding insulation.

14. A thermoelectric assembly as in claim 4 in which the other junction bridge is in the form of an annular metal member with a pipe section running through the center of said annular metal member.

15. A thermoelectric assembly as in claim 14 in which said metal pipe section is joined to other pipe sections by non-conductive means to form a continuous conduit for passing a liquid therethrough.

16. A thermoelectric assembly as in claim 4 in which the other junction bridge is in the form of an annular metal disc.

17. A thermoelectric assembly as in claim 16 in which said annular metal disc is soldered or brazed to a metal pipe section running through the center of said metal disc.

18. A thermoelectric assembly comprising a plurality of junction bridges, pairs of bodies of semiconductive material of different type with similar junction ends in electrical and heat conductive contact with the ends of junction bridges to form one or more rows of thermocouple assemblies connected in series, and means for providing an axial compressive force independently to each of said rows.

19. A thermoelectric assembly as in claim 18 in which at least one type of said junction bridges is in the form of finned tubing sections.

20. A thermoelectric assembly as in claim 6 in which said semiconductor bodies are annular.

21. A thermoelectric assembly as in claim 20 in which said metal disc elements are connected to said semiconductor bodies and said tubing sections by mechanical pressure only.

References Cited by the Examiner
UNITED STATES PATENTS

| | | | |
|---|---|---|---|
| 2,919,553 | 1/1960 | Fritts | 62—3 |
| 2,959,925 | 11/1960 | Frontti | 62—3 |
| 3,083,543 | 4/1963 | Stanton | 62—3 |
| 3,111,813 | 11/1963 | Blumentritt | 62—3 |
| 3,213,630 | 10/1965 | Mole | 62—3 |

WILIAM J. WYE, *Primary Examiner.*